United States Patent
Lu (10) Patent No.: US 7,106,708 B2
(45) Date of Patent: Sep. 12, 2006

(54) METHOD FOR IMPLEMENTING FAST DYNAMIC CHANNEL ALLOCATION (F-DCA) CALL ADMISSION CONTROL IN RADIO RESOURCE MANAGEMENT

(75) Inventor: Guang Lu, Verdun (CA)

(73) Assignee: InterDigital Technology Corp., Wilmington, DE (US)

( * ) Notice: Subject to any disclaimer, the term of this patent is extended or adjusted under 35 U.S.C. 154(b) by 148 days.

(21) Appl. No.: 10/725,787

(22) Filed: Dec. 2, 2003

(65) Prior Publication Data

US 2004/0162081 A1 Aug. 19, 2004

Related U.S. Application Data

(60) Provisional application No. 60/448,566, filed on Feb. 19, 2003.

(51) Int. Cl.
*H04Q 7/00* (2006.01)
*H04L 12/43* (2006.01)

(52) U.S. Cl. ............ 370/329; 370/436; 370/458; 455/450

(58) Field of Classification Search ............ 370/329, 370/436, 458, 330; 455/450, 452.1, 452.2
See application file for complete search history.

(56) References Cited

U.S. PATENT DOCUMENTS

| | | | |
|---|---|---|---|
| 5,579,306 A * | 11/1996 | Dent | 370/330 |
| 5,886,988 A * | 3/1999 | Yun et al. | 370/329 |
| 6,473,422 B1 | 10/2002 | Hall et al. | |
| 6,473,442 B1 | 10/2002 | Lundsjö et al. | |
| 6,721,568 B1 * | 4/2004 | Gustavsson et al. | 455/450 |
| 6,778,812 B1 * | 8/2004 | Zhang | 455/67.13 |
| 6,801,515 B1 * | 10/2004 | Ishikawa et al. | 370/342 |
| 6,842,618 B1 * | 1/2005 | Zhang | 455/452.1 |
| 6,865,393 B1 * | 3/2005 | Baum et al. | 455/452.2 |
| 6,405,045 B1 | 6/2005 | Choi et al. | |
| 2001/0036823 A1 | 11/2001 | Van Lieshout et al. | |
| 2002/0009061 A1 | 1/2002 | Willenegger | |
| 2002/0077068 A1 * | 6/2002 | Dent | 455/82 |
| 2002/0094817 A1 | 7/2002 | Rune et al. | |
| 2002/0119796 A1 | 8/2002 | Vanghi | |
| 2003/0069014 A1 * | 4/2003 | Raffel et al. | 455/426 |
| 2003/0081569 A1 * | 5/2003 | Sexton et al. | 370/329 |

FOREIGN PATENT DOCUMENTS

WO 0232179 4/2002

* cited by examiner

*Primary Examiner*—Afsar Qureshi
(74) *Attorney, Agent, or Firm*—Volpe and Koenig, P.C.

(57) ABSTRACT

A method for call admission control in a fast dynamic channel allocation wireless communication system begins by requesting that a call be admitted. System measurement results are obtained and timeslot sequences are generated by determining a figure of merit for each timeslot. A code set is determined and an attempt is made to assign a code set to a timeslot sequence, wherein each successful assignment is considered to be a solution. The solution having the lowest weighted total interference signal code power is selected, and codes are allocated for the selected solution. The physical resource allocation information is recorded and a response to the call admission request is issued.

14 Claims, 11 Drawing Sheets

METHOD FOR IMPLEMENTING FAST DYNAMIC CHANNEL ALLOCATION (F-DCA) CALL ADMISSION CONTROL IN RADIO RESOURCE MANAGEMENT

CROSS REFERENCE TO RELATED APPLICATIONS

This application claims priority from U.S. Provisional Application No. 60/448,566, filed Feb. 19, 2003, which is incorporated by reference as if fully set forth herein.

FIELD OF INVENTION

This application generally relates to radio resource management in wireless communication systems, and more particularly, to a Fast Dynamic Channel Allocation (F-DCA) call admission control procedure.

BACKGROUND

An important problem in the operation of a wireless communication system is how to efficiently use the available bandwidth to provide good service to as many customers as possible. It is known that radio resource management (RRM) is responsible for utilizing the air interface resources in order to guarantee quality of service (QoS), to maintain the planned coverage area, and to offer high capacity.

Call admission control (CAC) is a part of RRM, and accepts or rejects a request to establish a radio access bearer in the radio access network. Whenever there is a call coming, the RRM CAC entity in the controlling radio network controller (C-RNC) should check whether there are sufficient physical resources to meet the request of the call. If so, the RRM CAC entity will allocate the resources for the call; otherwise it will reject or queue the request. It is desirable to provide a method for implementing a F-DCA CAC procedure for optimizing allocation of physical resources.

SUMMARY

The present invention provides a F-DCA procedure for CAC, including the methodology to allocate physical resources from the view of system engineering.

By employing a module partitioning approach, a high level of reusability can be achieved. The modules can be reused for other F-DCA procedures, such as escape and background interference reduction. The modules can further be refined as necessary. This approach enables parallel processing wherein extensions can be implemented easily using the described approach.

A method for call admission control in a fast dynamic channel allocation wireless communication system begins by requesting that a call be admitted. System measurement results are obtained and timeslot sequences are generated by determining a figure of merit for each timeslot. A code set is determined and an attempt is made to assign a code set to a timeslot sequence, wherein each successful assignment is considered to be a solution. The solution having the lowest weighted total interference signal code power is selected, and codes are allocated for the selected solution. The physical resource allocation information is recorded and a response to the call admission request is issued.

BRIEF DESCRIPTION OF THE DRAWINGS

A more detailed understanding of the invention may be had from the following description of preferred embodiments, given by way of example, and to be understood with reference to the accompanying drawings in which.

DETAILED DESCRIPTION OF THE PREFERRED EMBODIMENTS

As used and described hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a Node-B, a site controller, an access point, or other type of interfacing device in a wireless environment.

Figure 1:
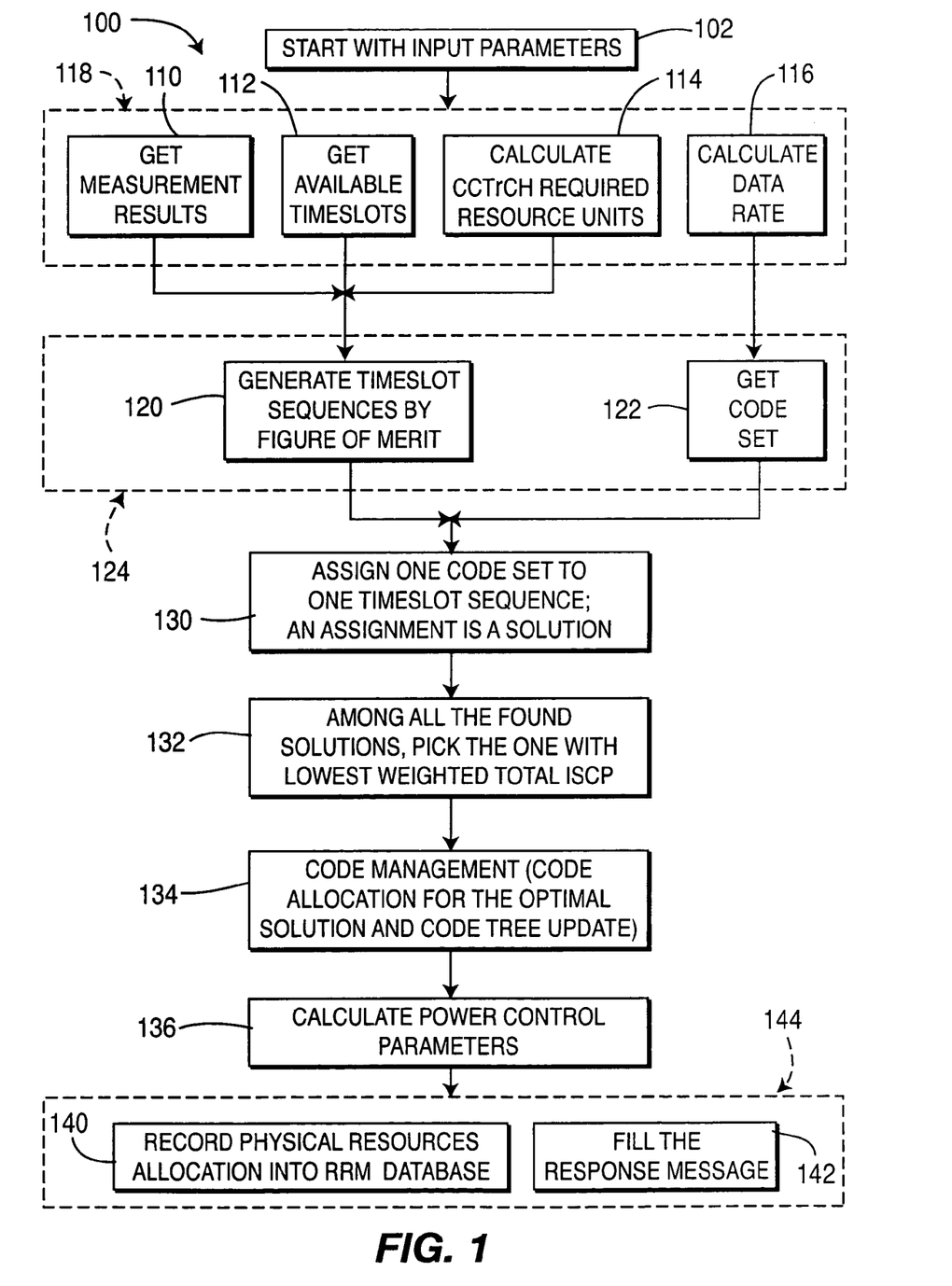
FIG. 1 is a flow diagram showing an overview of a F-DCA call admission control procedure in accordance with the present invention.
Figure 2A:
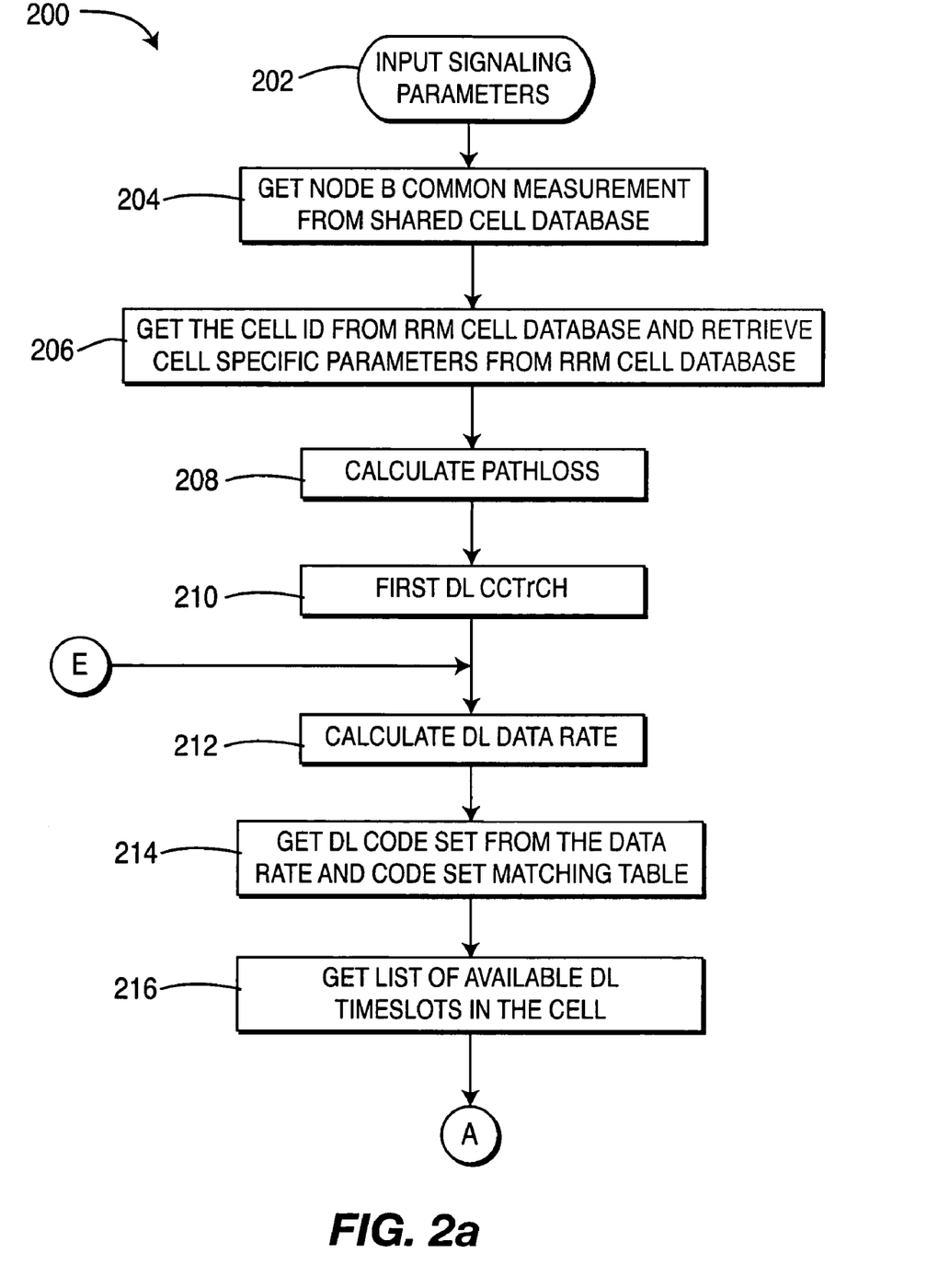
FIGS. 2a–2h are a flow diagram showing additional details of the F-DCA call admission control procedure shown in FIG. 1.
Figure 2B:
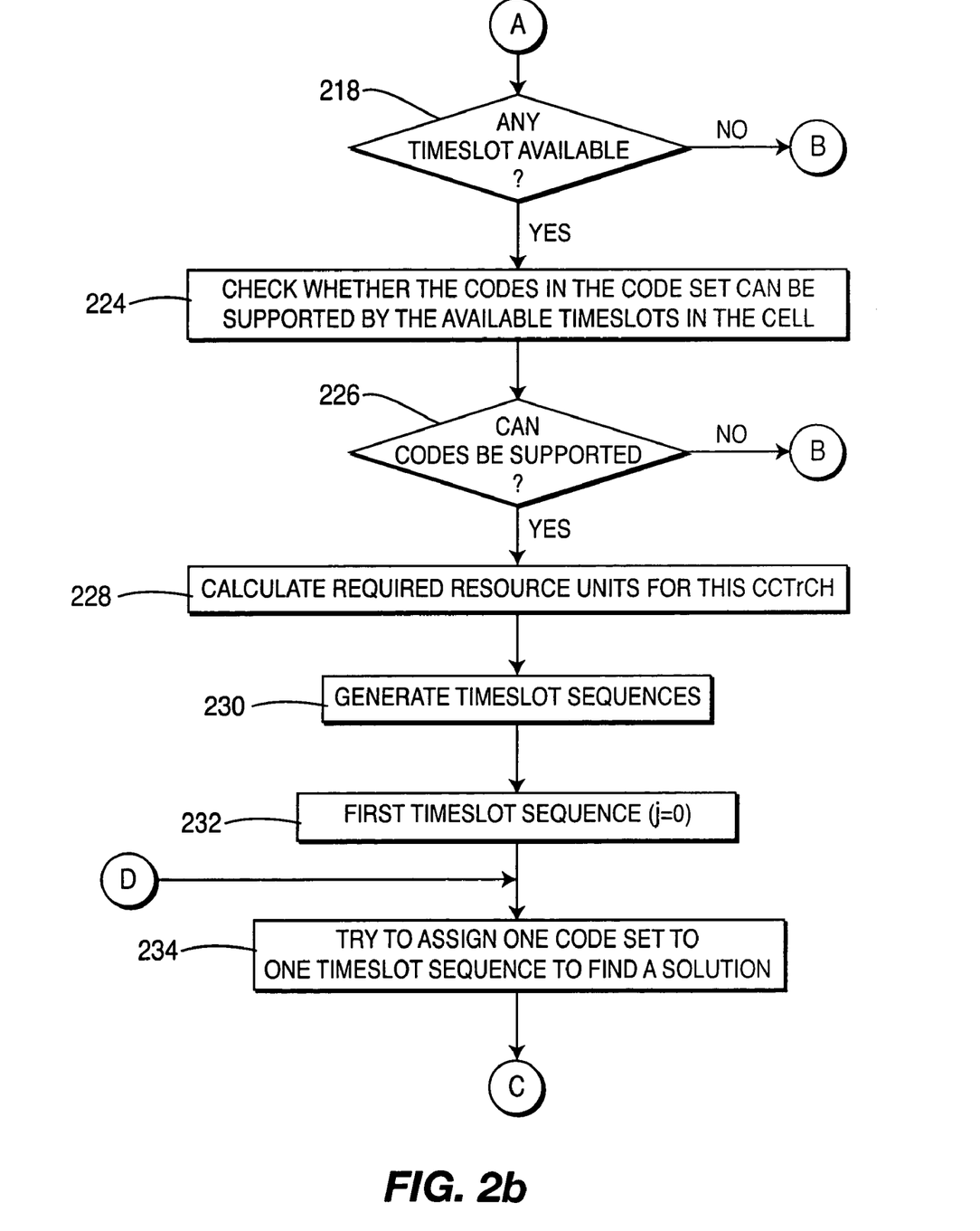
Figure 2C:
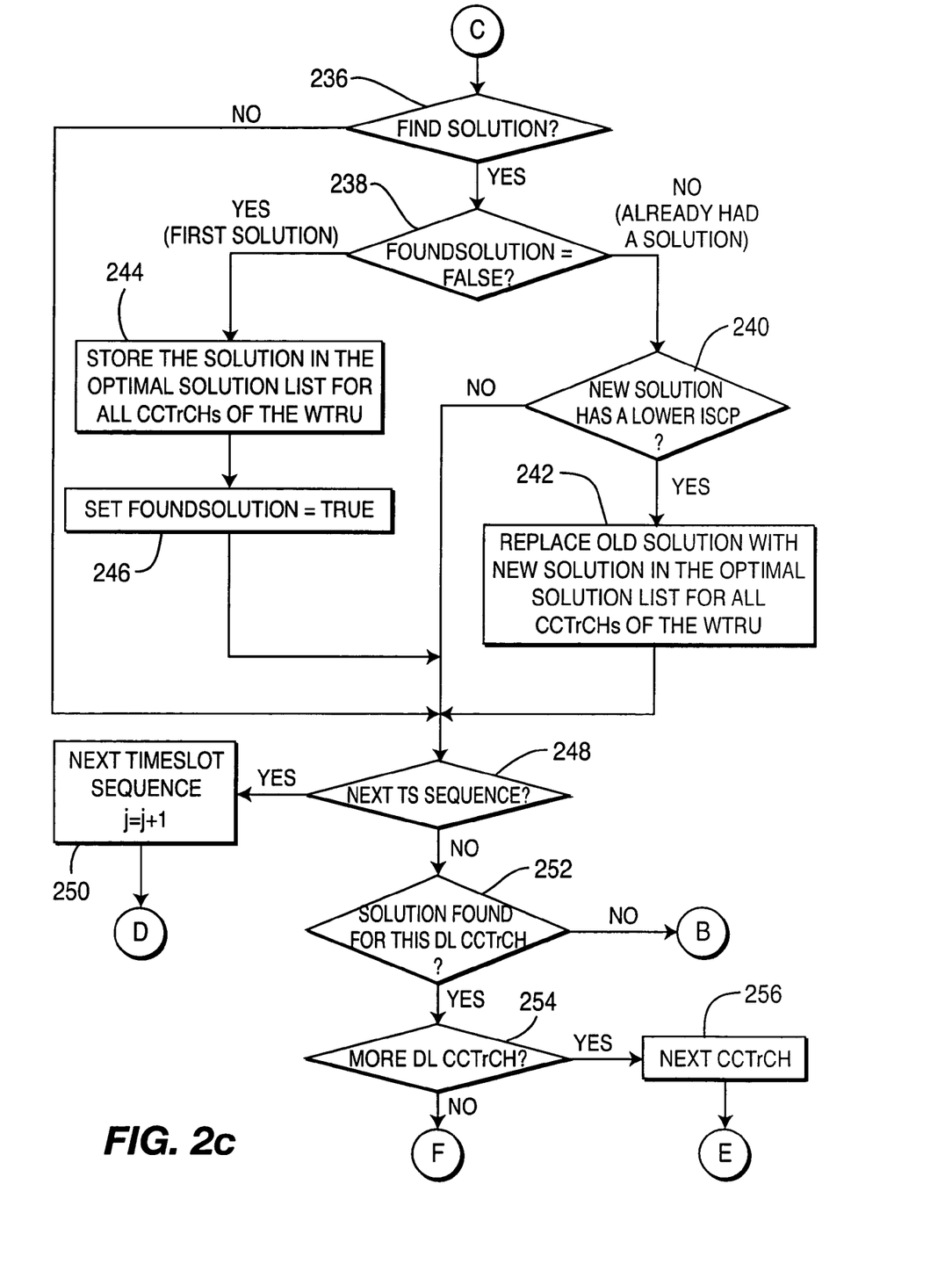
Figure 2D:
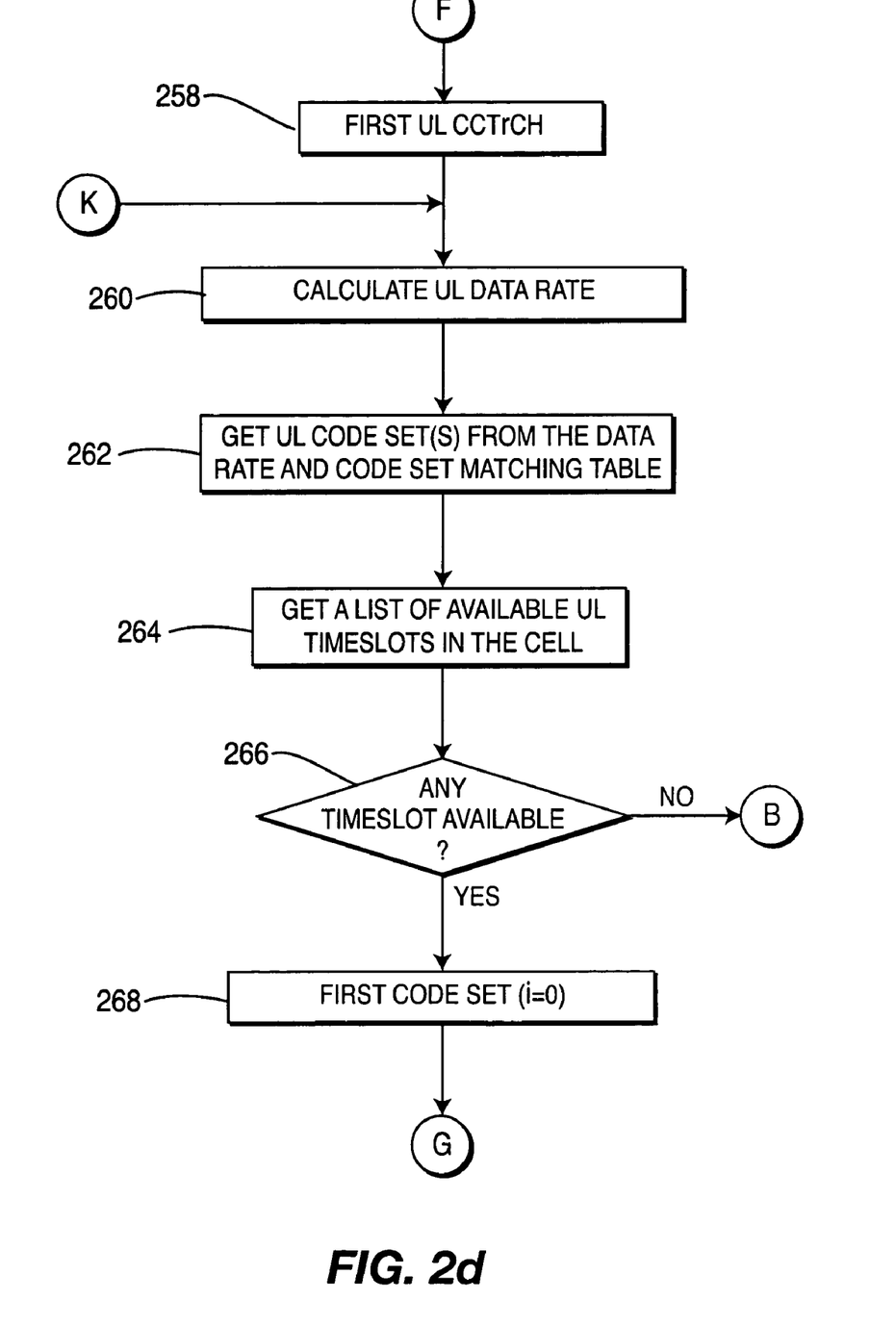
Figure 2E:
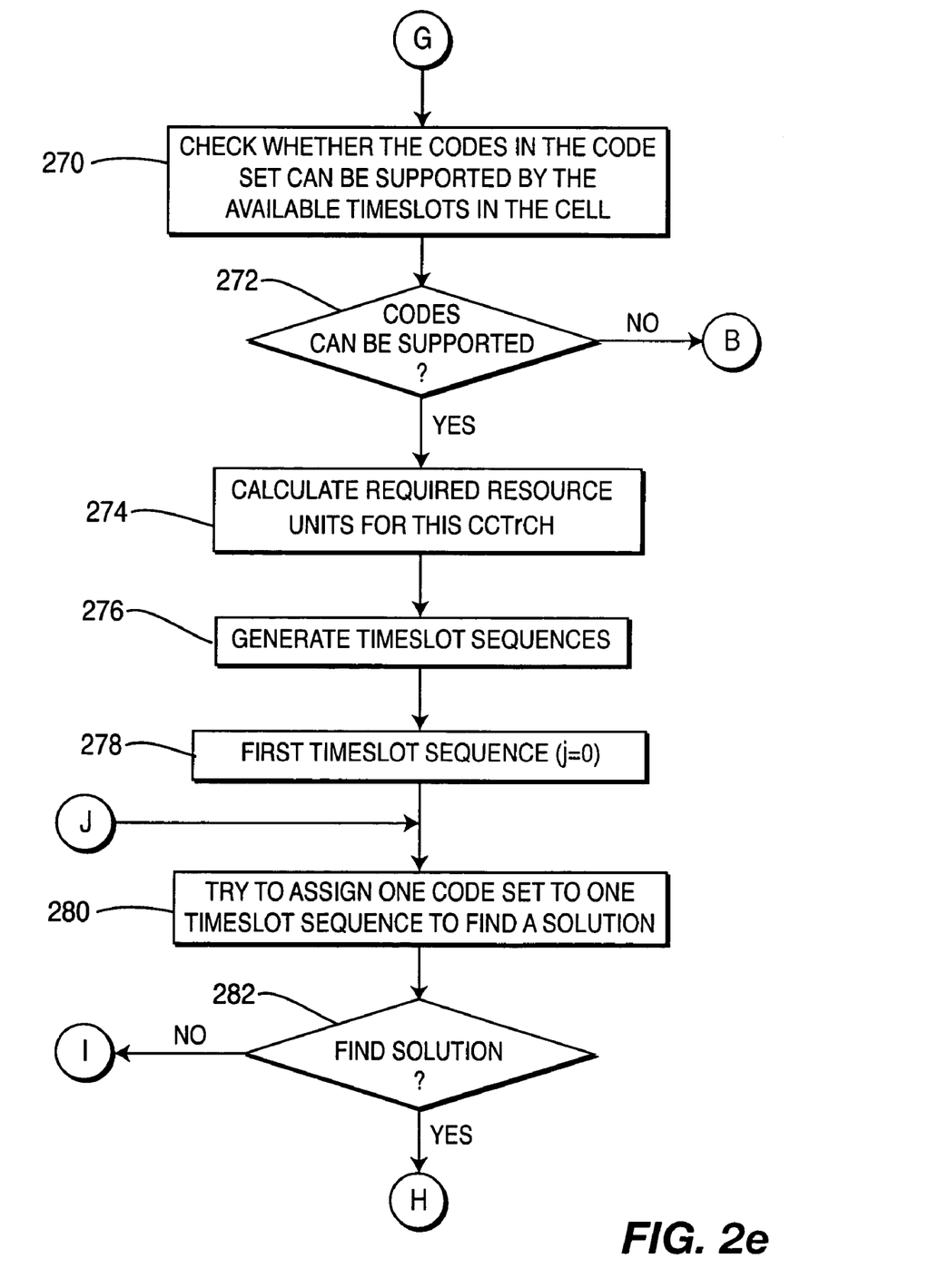
Figure 2F:
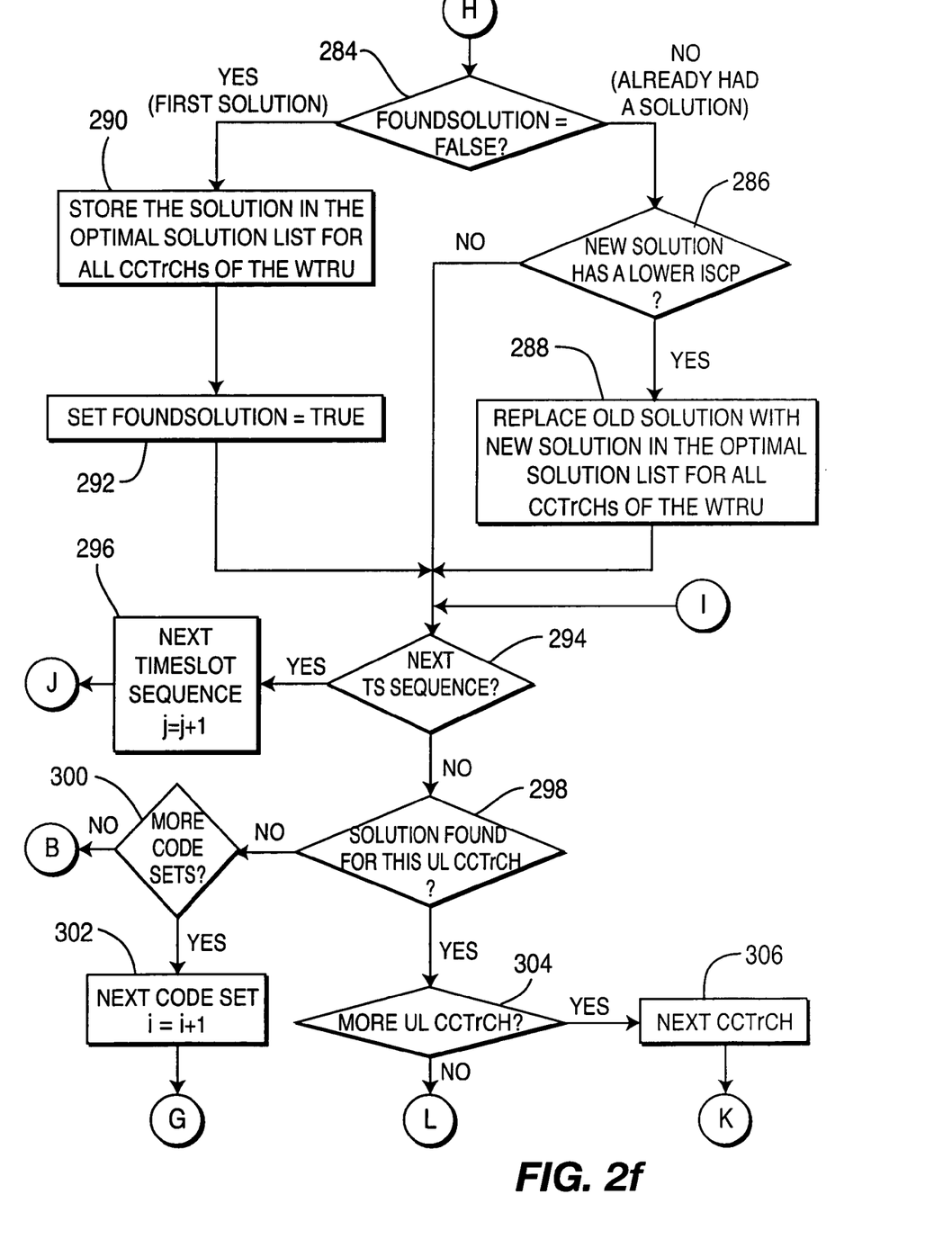
Figure 2G:
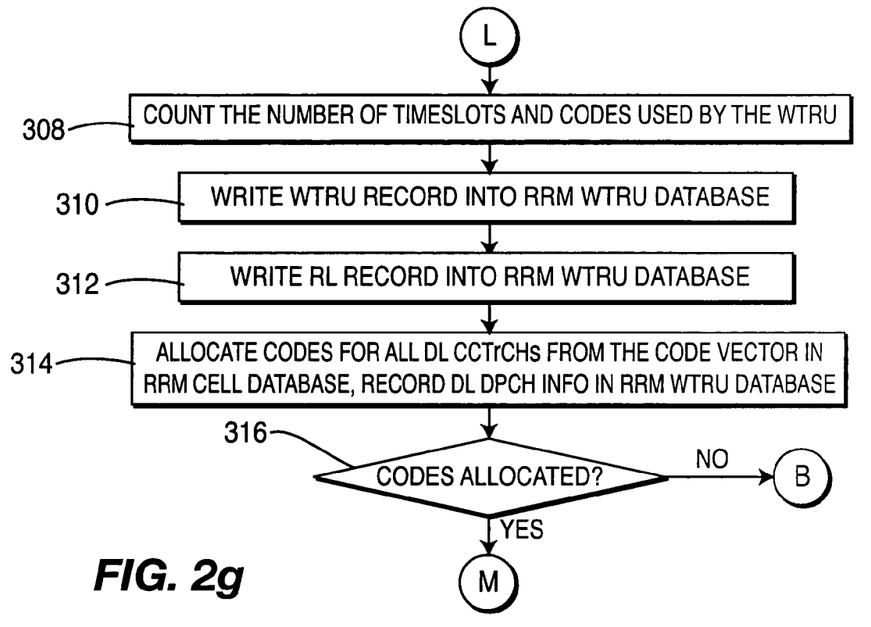
Figure 2H:
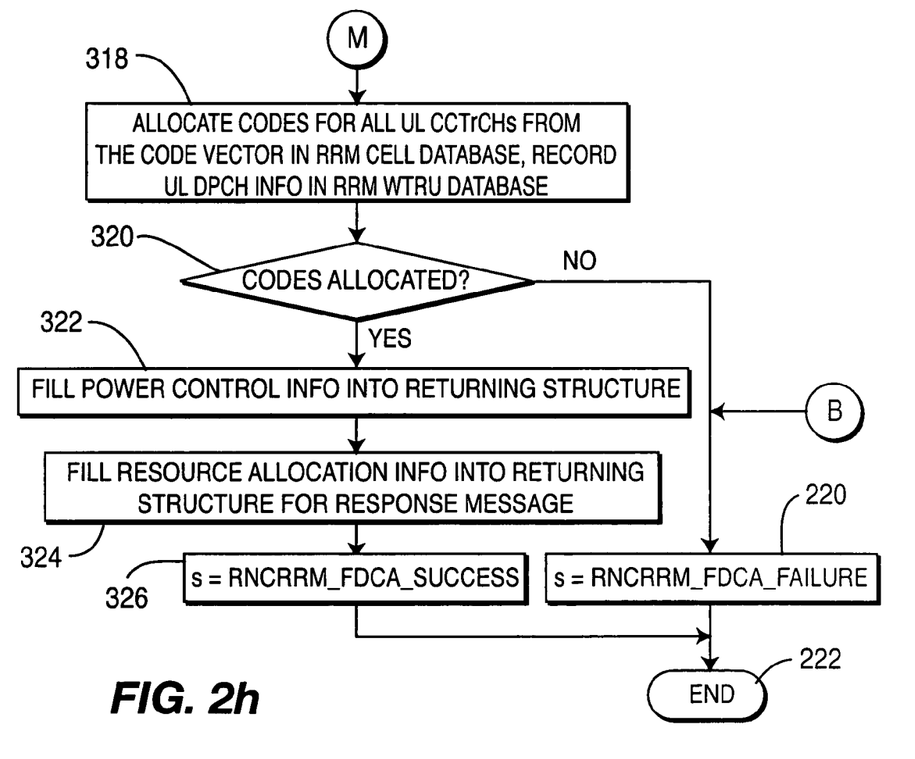

FIG. 1 is a flow diagram showing an overview of a fast dynamic channel allocation (F-DCA) call admission control (CAC) procedure 100. Input parameters are first collected from the CAC request (step 102). Next, measurement results are gathered (step 110), a list of the available timeslots is obtained (step 112), the number of required resource units (RUs) for the coded composite transport channel (CCTrCH) are calculated (step 114), and the data rate is calculated (step 116). Steps 110–116 may be executed in parallel and are shown collectively by dashed-line box 118. In step 110, the measurement results that are gathered include Node B and WTRU measurements, e.g., uplink (UL) and downlink (DL) interference signal code power (ISCP).

After the necessary information has been gathered and calculated, the timeslot sequences are generated by figure of merit (step 120). The figure of merit is a representation of each timeslot's assignment quality, such as with respect to interference and code fragmentation. Code fragmentation is a measure of the spread of the codes over the available time slots. To illustrate, if all codes are assigned to one timeslot, this results in low fragmentation. If at least one code is assigned to every timeslot, this results in high fragmentation. Generally, a higher fragmentation will result in a lower interference in each timeslot. However, a lower fragmentation allows for more flexibility in future RRM assignments due to the increased availability of some timeslots. A preferred figure of merit balances these two competing interests, although other factors may be used. The code set is obtained (step 122), based upon the calculated data rate. Steps 120 and 122 may be executed in parallel and are shown collectively by dashed-line box 124.

Next, one code set is assigned to a timeslot sequence (step 130). A successful assignment of a code set is considered to be a solution, which provides information as to which timeslots and spreading factor code are to be used to support the data rate of the CCTrCH. In the present application, the term "solution" refers to an information set relating to the timeslots and spreading factor that are to be used to support the data rate of a CCTrCH. A solution exists when a timeslot (or timeslots) and spreading factor can be allocated to the CCTrCH.

Among all of the found solutions, the solution with the lowest weighted total ISCP is selected (step 132). Codes are allocated for the optimal solution and the code tree is updated (step 134), in a process referred to as code management. The power control parameters are then calculated (step 136).

The physical resource allocation is recorded in the RRM database (step 140) and the response message to the CAC request is created (step 142). Steps 140 and 142 may be executed in parallel and are shown collectively by dashed-line box 144.

FIGS. 2a–2h are a flow diagram of a method 200 for call admission in F-DCA; the method 200 provides additional detail for the method 100 shown in FIG. 1 and described above. The method 200 is triggered by receipt of a signaling request with the parameters for transport channels (step 202). The common measurements used by the CAC procedure are obtained from the shared database at the Node B (step 204). The cell identification and the cell-specific parameters are obtained from the RRM cell database (step 206). Based upon this information, the pathloss is calculated (step 208).

The first DL CCTrCH is selected to be examined (step 210). The DL data rate is calculated from the transport format combination set (TFCS) of the CCTrCH (step 212). The TFCS is received as part of the signaling request in step 202. The DL code set is retrieved from the code set matching table, based upon the data rate (step 214). A code set specifies the spreading factor of the orthogonal variable spreading factor (OVSF) codes to support the data rate. For DL, only one code set is used for each data rate.

Next, a list of the available DL timeslots in the cell is assembled (step 216). A determination is made whether any timeslots are available (step 218). If there are no timeslots available, then this indicates that the call admission request will fail and a status flag is set to indicate the failure condition (step 220) and the procedure terminates (step 222).

If there is a timeslot available (step 218), then the codes in the code set are examined to determine whether they can be supported by the available timeslots in the cell (steps 224, 226). If the codes cannot be supported by the available timeslots in the cell, then this indicates that the call admission request will fail and the status flag is set to indicate the failure condition (step 220) and the procedure terminates (step 222).

If the codes can be supported by the available timeslots (step 226), then the required resource units for the current CCTrCH are calculated (step 228). Timeslot sequences are generated in descending order of interference and fragmentation, such as per a figure of merit (step 230). By applying different weight factors to interference and fragmentation, several different timeslot sequences can be generated.

The first timeslot sequence is selected (step 232) and an attempt is made to assign one code set to one timeslot sequence to find a solution (step 234). The details of the process of assigning a code set to a timeslot will be discussed below in connection with FIGS. 3a and 3b. Next, a determination is made whether a solution has been found (step 236). If a solution has been found, then a determination is made whether the solution is the first solution for this CCTrCH, based upon a foundSolution flag (step 238). If the foundSolution flag evaluates to true, indicating that a solution already exists, another determination is made whether the new solution has a lower ISCP than the existing solution (step 240). If the new solution has a lower ISCP, then the existing solution is replaced with the new solution in an optimal solution list for all CCTrCHs of the WTRU (step 242).

If the foundSolution flag evaluates to false (step 238), indicating that the current solution is the first solution for this CCTrCH, then the solution is stored in the optimal solution list for all CCTrCHs of the WTRU (step 244) and the foundSolution flag is set to true (step 246).

If a solution has not been found (step 236), or if the new solution has a higher ISCP than the existing solution (step 240), then the next step is to determine whether there is another timeslot sequence to be evaluated (step 248). If there is another timeslot sequence to be evaluated, the next timeslot sequence is selected (step 250) and the procedure then continues with step 234. This part of the process is executed as a loop, attempting to allocate the code set to each timeslot sequence.

If there no other timeslot sequences (step 248), then a determination is made whether a solution has been found for the current DL CCTrCH (step 252). If no solution has been found, then this indicates that the call admission request will fail and the status flag is set to indicate the failure condition (step 220) and the procedure terminates (step 222).

If a solution has been found for the current DL CCTrCH (step 252), then a determination is made whether there are additional DL CCTrCHs to be evaluated (step 254). If there are additional DL CCTrCHs to be evaluated, then the next CCTrCH is selected (step 256) and the procedure continues with step 212.

If there are no more DL CCTrCHs to be evaluated, then the evaluation of the UL channels begins by selecting the first UL CCTrCH (step 258). The UL data rate is retrieved (step 260) and the UL code sets are retrieved from the code set matching table, based upon the data rate (step 262). It is noted that there are multiple code sets associated with a single UL data rate. Next, a list of the available UL timeslots in the cell is assembled (step 264). A determination is made whether any timeslots are available (step 266). If there are no timeslots available, then this indicates that the call admission request will fail and the status flag is set to indicate the failure condition (step 220) and the procedure terminates (step 222).

If there are timeslots available, then the first code set is selected (step 268). The codes in the current code set are examined to determine whether they can be supported by the available timeslots in the cell (steps 270, 272). If the codes cannot be supported by the available timeslots in the cell, then this indicates that the call admission request will fail and the status flag is set to indicate the failure condition (step 220) and the procedure terminates (step 222).

If the codes can be supported by the available timeslots (step 272), then the required resource units for the current CCTrCH are calculated (step 274). Timeslot sequences are generated in descending order of interference and fragmentation, such as per a figure of merit (step 276), in a manner similar to the timeslot generation for the DL. The first timeslot sequence is selected (step 278) and an attempt is made to assign one code set to one timeslot sequence to find a solution (step 280).

Next, a determination is made whether a solution has been found (step 282). If a solution has been found, then a determination is made whether the solution is the first solution for this CCTrCH, based upon the foundSolution flag (step 284). If the foundSolution flag evaluates to true, indicating that a solution already exists, another determination is made whether the new solution has a lower ISCP than the existing solution (step 286). If the new solution has a lower ISCP, then the existing solution is replaced with the new solution in an optimal solution list for all CCTrCHs of the WTRU (step 288).

If the foundSolution flag evaluates to false (step 284), indicating that the current solution is the first solution for this CCTrCH, then the solution is stored in the optimal solution list for all CCTrCHs of the WTRU (step 290) and the foundSolution flag is set to true (step 292).

If a solution has not been found (step 282), or if the new solution has a higher ISCP than the existing solution (step 286), then the next step is to determine whether there is another timeslot sequence to be evaluated (step 294). If there is another timeslot sequence to be evaluated, the next timeslot sequence is selected (step 296) and the procedure then continues with step 280.

If there are no other timeslot sequences (step 294), then a determination is made whether a solution has been found for the current UL CCTrCH (step 298). If no solution has been found, then a determination is made whether there are additional code sets to be evaluated (step 300). If there are no additional code sets to be evaluated, then this indicates that the call admission request will fail and the status flag is set to indicate the failure condition (step 220) and the procedure terminates (step 222). If there are additional code sets to be evaluated, then the next code set is selected (step 302) and the procedure continues with step 270.

If a solution for the current UL CCTrCH has been found (step 298), then a determination is made whether there are additional UL CCTrCHs to be evaluated (step 304). If there are additional UL CCTrCHs to be evaluated, then the next UL CCTrCH is selected (step 306) and the procedure continues with step 260.

If there are no additional UL CCTrCHs to be evaluated (step 304), then the number of timeslots and codes used by the WTRU are counted (step 308). The WTRU record is then written into the RRM WTRU database (step 310) and the radio link (RL) record is written into the RRM WTRU database (step 312). The codes for all DL CCTrCHs are allocated from the code vector in the RRM cell database, and the DL dedicated physical channel (DPCH) information is written to the RRM WTRU database (step 314).

A determination is then made whether all of the DL codes have been allocated (step 316). If all of the DL codes have not been allocated, then this indicates that the call admission request will fail and the status flag is set to indicate the failure condition (step 220) and the procedure terminates (step 222).

If all of the DL codes have been allocated (step 316), then the codes for all UL CCTrCHs are allocated from the code vector in the RRM cell database, and the UL DPCH information is written to the RRM WTRU database (step 318). Next, a determination is made whether all of the UL codes have been allocated (step 320). If all of the UL codes have not been allocated, then this indicates that the call admission request will fail and the status flag is set to indicate the failure condition (step 220) and the procedure terminates (step 222).

If all of the UL codes have been allocated (step 320), then this indicates that call admission will be successful and the power control information is provided to a response message to the requesting WTRU (step 322). The response message is also provided with resource allocation information (step 324). The status flag is set to "success" (step 326) and the procedure terminates (step 222).

In the method 200, the CAC function initially only attempts to place the required spreading factor of codes into the available timeslots, and does not perform the actual code allocation until all of the codes can be allocated. The reason for this is that code allocation requires changing the code tree for the timeslots in the cell. Unless it is certain that all the CCTrCHs can be supported, it is not efficient to allocate some of the codes and roll back if there is a failure in the middle of the procedure. Once all of the solutions have been found, code allocation cannot fail because of insufficient resources. However, the code allocation may fail due to other reasons, for example, failure of memory allocation.

Figure 3A:
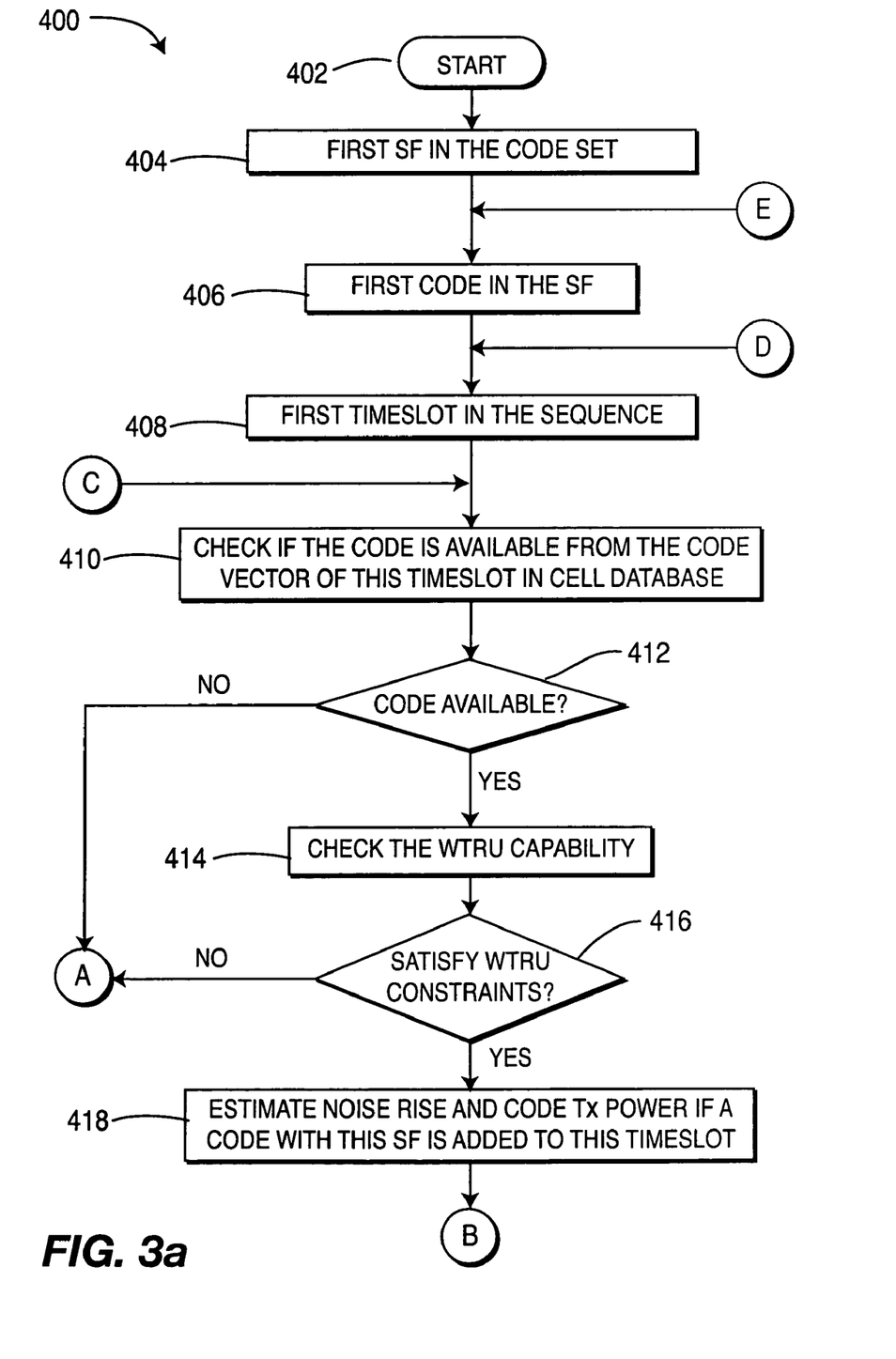
FIGS. 3a and 3b are a flow diagram of a method for assigning a code set to a timeslot used by the F-DCA call admission control procedure shown in FIG. 1.
Figure 3B:
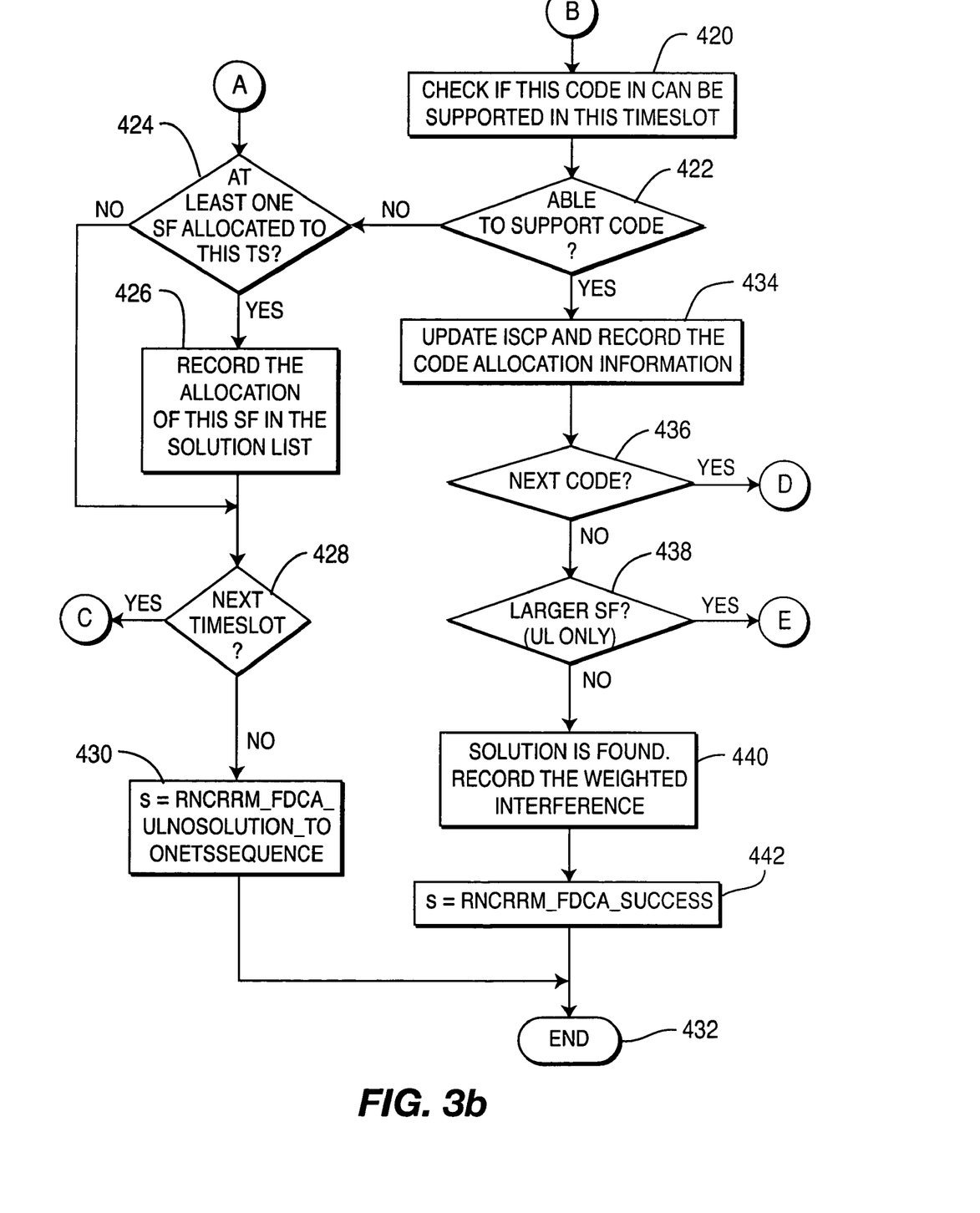

FIGS. 3a and 3b show a method 400 of assigning a code set to a timeslot, as used by steps 234 and 280 of the method 200. The method 400 begins at step 402, and the first spreading factor (SF) in the code set is selected (step 404). Next, the first code within the current spreading factor is examined (step 406) and the first timeslot in the sequence is selected (step 408). A determination is then made whether the selected code is available from the code vector of the selected timeslot in the cell database (steps 410, 412).

If the code is available, then the WTRU capability is evaluated (step 414) and a determination is made whether the available code satisfies the WTRU constraints (step 416). If the available code satisfies the WTRU constraints, then the noise rise and the code transmission power are estimated (step 418). This estimate is a prediction of what would happen if the code with the selected spreading factor was added to the selected timeslot. Then a determination is made whether the code can be supported in the selected timeslot (steps 420, 422).

If the code cannot be supported in the selected timeslot (step 422), or if there is no code available (step 412), or if the available code does not satisfy the WTRU constraints (step 416), a determination is made whether at least one spreading factor has been allocated to the selected timeslot (step 424). If there is at least one spreading factor allocated to the selected timeslot, then the allocation of the selected spreading factor is recorded in the solution list (step 426). Next a determination is made whether there are additional timeslots to be evaluated (step 428); this step is also performed if there are no spreading factors allocated to the current timeslot. If there are additional timeslots to be evaluated (step 428), the method continues with step 410. If there are no additional timeslots to be evaluated, then a status flag is set to "no solution" (step 430) and the method terminates (step 432).

If the selected timeslot can support the code (step 422), then the ISCP value is updated and the code allocation information is recorded in the cell database (step 434). Next, a determination is made whether there are additional codes to be evaluated (step 436). If there are additional codes to be evaluated, then the next code is selected and the method continues with step 408.

If there are no additional codes to be evaluated (step 436), then a determination is made, on the UL only, whether there is a larger spreading factor available (step 438). If there is a larger spreading factor available, then the next spreading factor is selected and the method continues with step 406. If there is no larger spreading factor available (step 438) or if the DL is being evaluated (in which case step 438 would be skipped in its entirety), a solution has been found and the weighted interference value is recorded (step 440). The status flag is set to "success" (step 442) and the method terminates (step 432).

Figure 4:
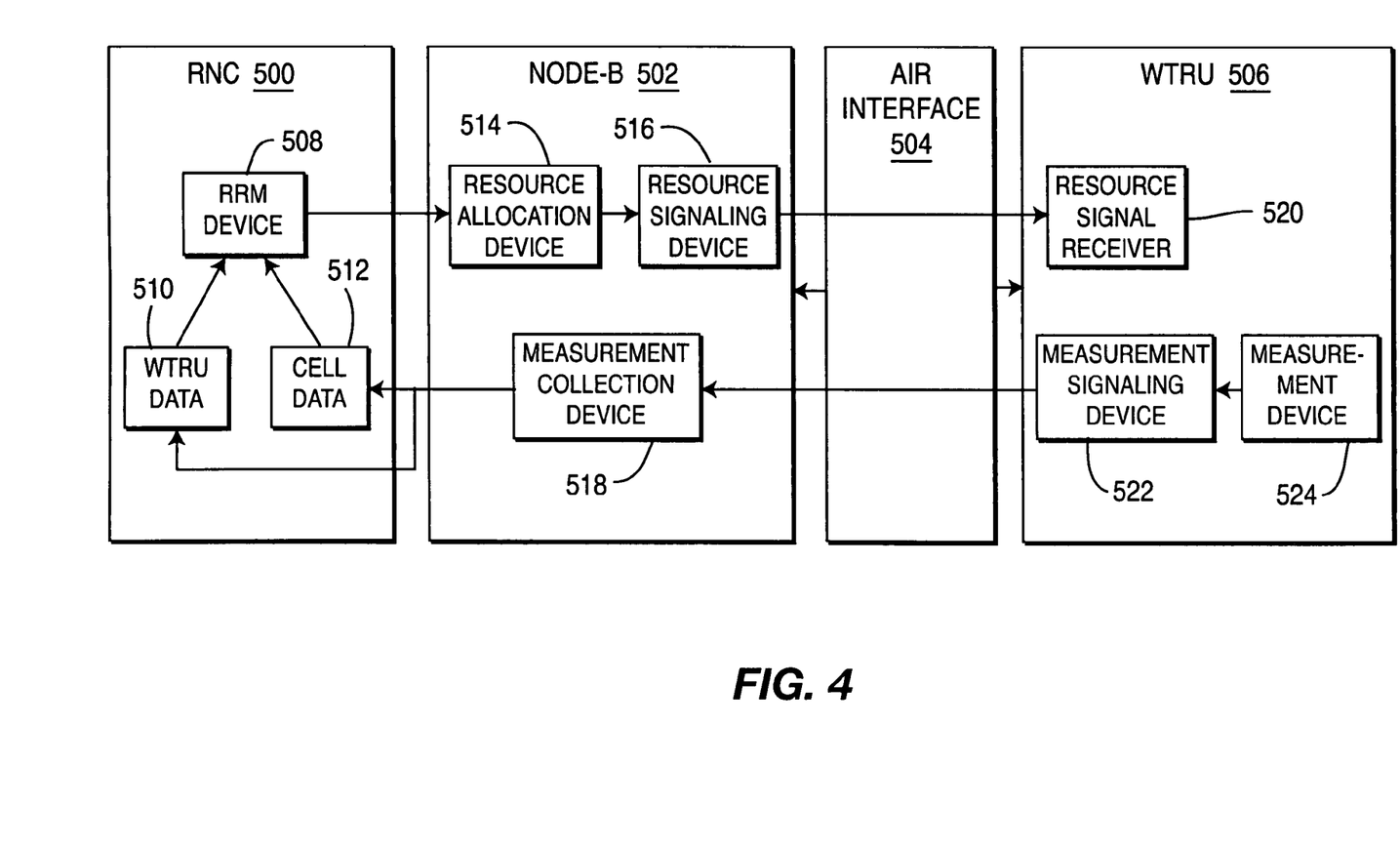
FIG. 4 is a simplified diagram of a call admission control system.

FIG. 4 is a simplified diagram of a call admission control system. A RNC 500 has a RRM device 508 for making call admission control decisions. The RRM device 508 uses WTRU related data 510 and cell related data 512 in the decisions. A Node B 502 has a resource allocation device 514 for allocating resources in response to the call admission decision. A resource signaling device 516 signals resource allocations, such as code and timeslot, through the air interface 504 to a WTRU 506. A resource signal receiver 520 receives the resource allocation signal.

A measurement device 524 at the WTRU 506 takes WTRU specific measurements, such as interference measurement, pathloss, SIR, etc. A measurement signaling device 522 signals these measurements to the Node B 502. A measurement collection device 518 at the Node B 502 collects the WTRU measurements along with the cell specific measurements. These collected measurements are used to update the WTRU data 510 and cell data 512 at the RNC 500.

While specific embodiments of the present invention have been shown and described, many modifications and variations could be made by one skilled in the art without departing from the scope of the invention. The above description serves to illustrate and not limit the particular invention in any way.

What is claimed is:

1. A method for call admission control in a fast dynamic channel allocation wireless communication system, comprising the steps of:
   requesting that a call be admitted;
   obtaining measurement results;
   generating timeslot sequences by determining a figure of merit for each timeslot;
   determining a plurality of code sets;
   assigning one of said plurality of code sets to one timeslot sequence, wherein a successful assignment of a code set to a timeslot sequence is considered to be a solution;
   selecting the solution having the lowest weighted total interference signal code power (ISCP);
   allocating codes for the selected solution;
   recording a physical channel resource allocation information for the selected solution relating to the physical channel used; and
   responding to the call admission request.

2. The method according to claim 1, wherein the obtaining step includes
   collecting input parameters from the call admission request;
   gathering the measurement results from a Node B and a wireless transmit/receive unit using the communication system;
   retrieving a list of available timeslots; and
   calculating the data rate.

3. The method according to claim 2, wherein the determining step is based upon the calculated data rate.

4. The method according to claim 1, wherein the figure of merit is a representation of the assignment quality of the timeslot.

5. The method according to claim 1, wherein the assigning step includes
   selecting a code and a timeslot;
   determining whether the code is available from a code vector of the selected timeslot;
   evaluating whether the code can be supported in the selected timeslot; and
   recording the code allocation information.

6. The method according to claim 5, wherein the selecting step includes
   selecting a spreading factor from the code set;
   examining a code in the selected spreading factor; and
   selecting a timeslot from the timeslot sequence.

7. The method according to claim 5, wherein the evaluating step includes
   determining whether the selected code satisfies the constraints of the wireless transmit/receive unit; and
   estimating the noise rise and the code transmission power that would result if the selected code is added to the selected timeslot.

8. The method according to claim 5, wherein the recording step includes updating the ISCP value.

9. The method according to claim 5, further comprising the step of recording the weighted ISCP value once a solution is found.

10. The method according to claim 5, wherein the steps are performed for each timeslot in the timeslot sequence.

11. The method according to claim 10, wherein the steps are performed for each code in the spreading factor.

12. The method according to claim 11, wherein the steps are performed for each spreading factor in the code set.

13. The method according to claim 1, wherein the allocating step includes updating a code tree.

14. The method according to claim 1, wherein the recording step includes storing the information in a centralized radio resource management information database.

* * * * *

UNITED STATES PATENT AND TRADEMARK OFFICE
CERTIFICATE OF CORRECTION

| | | |
|---|---|---|
| PATENT NO. | : 7,106,708 B2 | Page 1 of 1 |
| APPLICATION NO. | : 10/725787 | |
| DATED | : September 12, 2006 | |
| INVENTOR(S) | : Guang Lu | |

It is certified that error appears in the above-identified patent and that said Letters Patent is hereby corrected as shown below:

IN THE DRAWINGS

Sheet 10, FIG.3b, item 420, line 1, after the word "CODE", delete "IN".

IN THE SPECIFICATION

Column 2, line 10, after the word "are", delete "a flow diagram" and insert therefor --flow diagrams--.

Column 2, line 13, after the word "are", delete "a flow diagram" and insert therefor --flow diagrams--.

Column 3, line 15, after the word "are", delete "a flow diagram" and insert therefor --flow diagrams--.

Column 4, line 20, after the word "there", insert --are--.

Signed and Sealed this

Seventeenth Day of April, 2007

JON W. DUDAS
*Director of the United States Patent and Trademark Office*